US009650546B2

(12) United States Patent
Yamamoto et al.

(10) Patent No.: US 9,650,546 B2
(45) Date of Patent: May 16, 2017

(54) DOUBLE-SIDED ADHESIVE SHEET FOR IMAGE DISPLAY DEVICE, DOUBLE-SIDED ADHESIVE SHEET WITH RELEASE FILM FOR IMAGE DISPLAY DEVICE, AND IMAGE DISPLAY DEVICE USING SAME (71) Applicant: MITSUBISHI PLASTICS, INC., Chiyoda-ku (JP)

(72) Inventors: Ryota Yamamoto, Nagahama (JP); Makoto Inenaga, Nagahama (JP); Kazunori Inoue, Chiyoda-ku (JP); Mitsuru Kojima, Chiyoda-ku (JP)

(73) Assignee: MITSUBISHI PLASTICS, INC., Chiyoda-ku (JP)

( * ) Notice: Subject to any disclaimer, the term of this patent is extended or adjusted under 35 U.S.C. 154(b) by 0 days.

(21) Appl. No.: 14/440,179

(22) PCT Filed: Oct. 10, 2013

(86) PCT No.: PCT/JP2013/077571
§ 371 (c)(1),
(2) Date: May 1, 2015

(87) PCT Pub. No.: WO2014/073316
PCT Pub. Date: May 15, 2014

(65) Prior Publication Data
US 2015/0291852 A1    Oct. 15, 2015

(30) Foreign Application Priority Data
Nov. 9, 2012  (JP) ................................ 2012-247552

(51) Int. Cl.
*C09J 7/02* (2006.01)
*B32B 3/30* (2006.01)
(Continued)

(52) U.S. Cl.
CPC ........... *C09J 7/02* (2013.01); *B32B 3/02* (2013.01); *B32B 3/04* (2013.01); *B32B 3/30* (2013.01);
(Continued)

(58) Field of Classification Search
CPC ................. B32B 3/30; B32B 7/12; C09J 7/00
See application file for complete search history.

(56) References Cited

U.S. PATENT DOCUMENTS

2007/0292650 A1* 12/2007 Suzuki ................. C09J 7/0207
428/41.8
2008/0275327 A1  11/2008 Faarbaek et al.
(Continued)

FOREIGN PATENT DOCUMENTS

JP    2001-172584       6/2001
JP    2003-238915 A     8/2003
(Continued)

OTHER PUBLICATIONS

International Search Report issued Jan. 21, 2014 in PCT/JP2013/077571 filed Oct. 10, 2013.
(Continued)

*Primary Examiner* — Victor Chang
(74) *Attorney, Agent, or Firm* — Oblon, McClelland, Maier & Neustadt, L.L.P.

(57) ABSTRACT

Provided is a novel double-sided adhesive sheet for image display device which can be bonded to the adhesion surface in close contact without space therebetween although there is a step due to printing or the like on the adhesion surface to be bonded to the adhesive sheet. The double-sided adhesive sheet for image display device 1 of the invention is a sheet to bond any two adherends selected from a surface protective panel 2, a touch panel 3, and an image display panel, and the sheet is characterized in that at least one of the adherends (surface protective panel 2) has a stepped portion (Continued)

2b on an adhesion surface 2a to adhere to the double-sided adhesive sheet 1 and the surface shape of the bonding surface 1a of the double-sided adhesive sheet 1 to be bonded to the adhesion surface 2a is shaped in accordance with the surface shape of the adhesion surface 2a.

14 Claims, 6 Drawing Sheets

(51) Int. Cl.
*G02F 1/1333* (2006.01)
*B32B 7/12* (2006.01)
*C09J 7/00* (2006.01)
*B32B 7/04* (2006.01)
*B32B 7/06* (2006.01)
*B32B 27/08* (2006.01)
*B32B 27/30* (2006.01)
*B32B 27/32* (2006.01)
*B32B 27/34* (2006.01)
*B32B 27/36* (2006.01)
*B32B 27/40* (2006.01)
*B32B 3/04* (2006.01)
*B32B 3/02* (2006.01)

(52) U.S. Cl.
CPC ............... *B32B 7/045* (2013.01); *B32B 7/06* (2013.01); *B32B 7/12* (2013.01); *B32B 27/08* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *C09J 7/00* (2013.01); *G02F 1/133308* (2013.01); *B32B 2307/306* (2013.01); *B32B 2307/412* (2013.01); *B32B 2307/712* (2013.01); *B32B 2307/748* (2013.01); *B32B 2405/00* (2013.01); *B32B 2457/20* (2013.01); *C09J 2201/128* (2013.01); *C09J 2201/28* (2013.01); *C09J 2203/318* (2013.01); *C09J 2400/22* (2013.01); *G02F 2202/28* (2013.01)

(56) References Cited

U.S. PATENT DOCUMENTS

| | | | |
|---|---|---|---|
| 2010/0265195 | A1 | 10/2010 | Watanabe |
| 2011/0254790 | A1 | 10/2011 | Suzuki et al. |
| 2012/0328891 | A1* | 12/2012 | Suwa ................... C09J 7/0246 428/522 |
| 2013/0211028 | A1 | 8/2013 | Shinike et al. |

FOREIGN PATENT DOCUMENTS

| | | |
|---|---|---|
| JP | 2004-231723 A | 8/2004 |
| JP | 2008-532596 A | 8/2008 |
| JP | 2009-025602 A | 2/2009 |
| JP | 2009-155503 | 7/2009 |
| WO | WO 2009/078195 A1 | 6/2009 |
| WO | WO 2010/044466 A1 | 4/2010 |
| WO | WO 2012/023567 A1 | 2/2012 |
| WO | WO 2012/124389 A1 | 9/2012 |

OTHER PUBLICATIONS

Office Action as received in the corresponding Korean Patent Application No. 10-2015-7014414 dated Nov. 18, 2016 w/English Translation.

* cited by examiner

DOUBLE-SIDED ADHESIVE SHEET FOR IMAGE DISPLAY DEVICE, DOUBLE-SIDED ADHESIVE SHEET WITH RELEASE FILM FOR IMAGE DISPLAY DEVICE, AND IMAGE DISPLAY DEVICE USING SAME

TECHNICAL FIELD

The present invention relates to a double-sided adhesive sheet for image display device and a double-sided adhesive sheet with release film for image display device which are used in an image display device such as a liquid crystal display (LCD) device, an organic EL display (OLED) device and a plasma display panel (PDP). In addition, the invention relates to an image display device using these double-sided adhesive sheets for image display device.

BACKGROUND ART

In recent years, the market of the touch panel type image display device, such as smartphones and tablets has grown rapidly, and the image display device is required to be furnished with design properties, fashionability, and decorativeness, and thus the thinning, weight saving, and variation in color of the image display device has progressed.

For example, in the surface protective panel of an image display device, a plastic material such as an acrylic resin plate or a polycarbonate plate is used together with tempered glass or a member is used which is printed in white together with common black as the back printing of the peripheral portion other than the viewable aperture surface portion of the surface protective panel.

Moreover, in the touch panel, a plastic film sensor is used together with a glass sensor, or a touch on lens (TOL) member is used in which the touch panel function is integrated with the surface protective panel, furthermore, an on-cell or in-cell type member is used in which the touch panel function is integrated with the surface protective panel.

In addition, these surface protective panel, touch panel, and the image display panel (collectively, also referred to as the "components for image display device") are combined to form the touch panel type image display device.

Furthermore, a structure is general in which the gaps between the respective components for image display device are filled with a transparent resin in order to further improve the image visibility.

For example, a liquid adhesive, a thermoplastic adhesive sheet material, an adhesive sheet material or the like is known as the resin material to fill the gap.

In the case of liquid adhesive, resin sealing is possible since it freely flows through the gap, but there is a problem that it is difficult to obtain in-plane thickness accuracy in the viewable aperture surface portion and ultraviolet light does not reach the printing back portion of the protective panel when the liquid adhesive is cured by irradiating with ultraviolet light so as to remain in an uncured state and to contaminate the electrodes or the wires and also there is a concern that the uncured liquid resin attacks the plastic member in the image display device with time so as to cause solvent cracking and peeling between the members occurs due to the curing shrinkage in the cured portion.

In addition, in the case of the thermoplastic adhesive sheet material, it is possible to seal the gap by heating and melting the sheet material, but there is a concern that the resin overflows during heating and melting or the residual stress or the warp occurs due to heating linear expansion difference, a decrease in cycle time due to the heating process occurs, and a problem of temperature management at the time of storage or transportation in the case of the material to melt at a low temperature rises.

In that respect, it is possible to easily bond the sheet material at room temperature, the in-plane dimensional accuracy is also significantly favorable, and the cycle time is also short to be excellent in mass productivity in the case of the adhesive sheet material.

An adhesive sheet to bond the components for image display device to each other is disclosed in Patent Documents 1 and 2.

CITATION LIST

Patent Document

Patent Document 1: JP 2003-238915 A
Patent Document 2: JP 2004-231723 A

SUMMARY OF THE INVENTION

Problem to be Solved by the Invention

In recent years, back printing in white in addition to black has been performed along with the variation in color of the image display panel. The thickness of back printing is about from 5 to 20 µm in the case of black, but the thickness of printing is required to be about from 40 to 80 µm in order to conceal the light leakage from the image display panel in the case of white.

However, the liquid adhesive or the thermoplastic adhesive sheet material are a resin to be completely fluid, but the adhesive sheet material is less fluid and thus resin sealing is not complete in a case in which the surface irregularity of the adherend is great.

Figure 11:
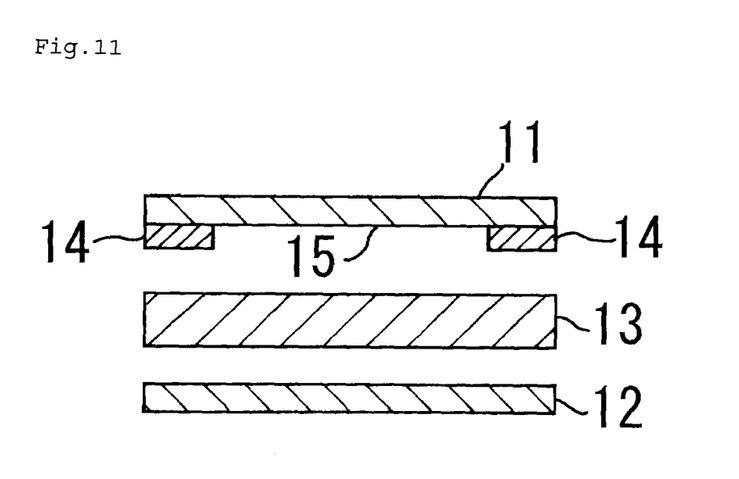
FIG. 11 is a cross-sectional view illustrating an example of the state before a surface protective panel and a touch panel are bonded to each other using the adhesive sheet of the related art.
Figure 12:
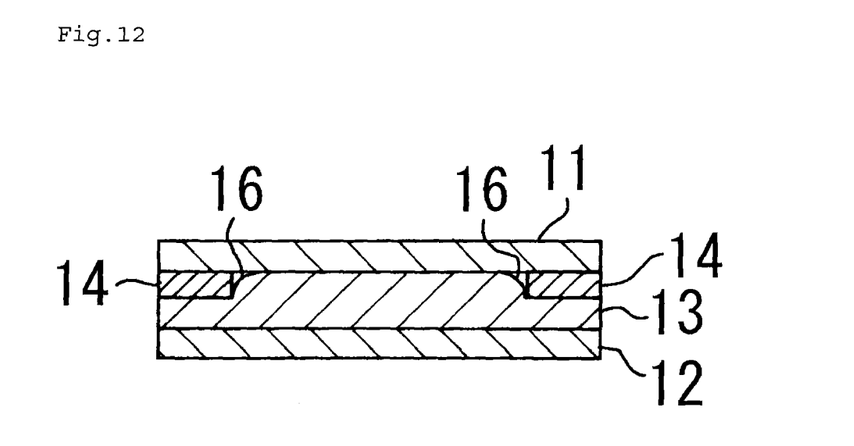
FIG. 12 is a cross-sectional view illustrating an example of the state in which a surface protective panel and a touch panel are bonded to each other using the adhesive sheet of the embodiment illustrated in FIG. 11.

For example, a step is formed in a case in which the peripheral portion of a surface protective panel 11 is subjected to printing 14 in white or the like as illustrated in FIG. 11. In such a case, a gap 16 is formed at the internal corner portion between the printing 14 and a viewable aperture surface 15 and thus visibility deteriorates or foaming and peeling occur due to a rapid change in temperature as illustrated in FIG. 12 in some cases when the surface protective panel 11 and a touch panel 12 are bonded via an adhesive sheet material 13.

Hence, step followability that the adhesive sheet material 13 can be filled thoroughly to follow the step caused by the printing 14 is required in order to fit the members using the adhesive sheet material 13 without space therebetween.

It is considerable to design the double-sided adhesive sheet to be relatively flexible in order to impart such step followability, but there is a possibility that foaming and peeling problems occur at the bonding interface when this double-sided adhesive sheet is exposed to a high temperature and high humidity environment or a rapid change in temperature.

On the other hand, it is considerable to design the double-sided adhesive sheet to be relatively hard and to have high cohesive force in order to solve such foaming and peeling problems, but there is a possibility that the double-sided adhesive sheet is inferior in step followability as a result in the case of such a design.

Accordingly, an object of the invention is to provide a novel double-sided adhesive sheet for image display device which can be bonded to the adhesion surface in close contact without space therebetween although there is a step due to printing or the like on the adhesion surface to adhere to the adhesive sheet.

Means for Solving Problem

The inventors have conducted intensive investigations on the assumption that there is a limit to impart step followability and antifoaming properties to the double-sided adhesive sheet by the material design thereof and, as a result, found out that it is possible to solve the above problems by subjecting the double-sided adhesive sheet itself to the shaping process to shape in accordance with the surface shape of an adherend in advance and then bonding the resulting sheet to the surface of the adherend without space therebetween, thereby completing the invention.

In other words, the invention is intended to provide a double-sided adhesive sheet for image display device to bond any two adherends selected from components for image display device of a surface protective panel, a touch panel, and an image display panel, in which at least one of the adherends has a stepped portion on an adhesion surface to adhere to the double-sided adhesive sheet, and a shape of a bonding surface of the double-sided adhesive sheet to be bonded to the adhesion surface is shaped in accordance with a surface shape of the adhesion surface.

The double-sided adhesive sheet for image display device of the invention can be bonded to the adhesion surface in close contact without space therebetween although there is a step on the adhesion surface due to printing or the like since the surface shape of the bonding surface is shaped in accordance with the surface shape of the adhesion surface.

MODE(S) FOR CARRYING OUT THE INVENTION

Hereinafter, an example of the embodiments of the invention will be described, but the invention is not limited to the following embodiments.

Figure 1:
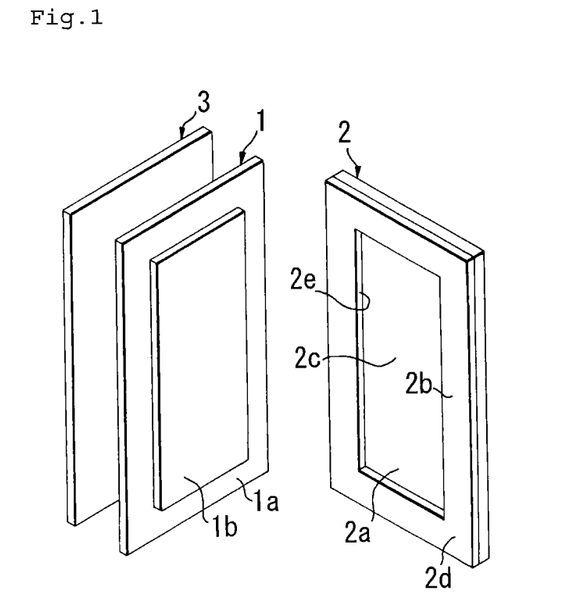
FIG. 1 is a schematic exploded perspective view illustrating an example of a case in which a surface protective panel and a touch panel are bonded to each other using the double-sided adhesive sheet of one embodiment of the invention.
Figure 2:
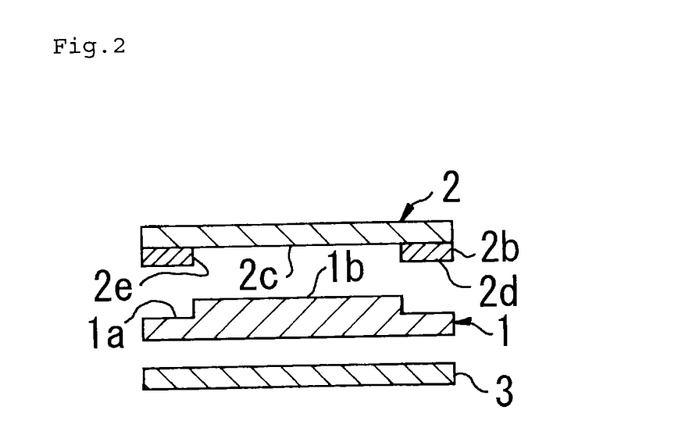
FIG. 2 is a cross-sectional view illustrating an example of the state before a surface protective panel and a touch panel are bonded to each other using the double-sided adhesive sheet of the embodiment illustrated in FIG. 1.
Figure 3:
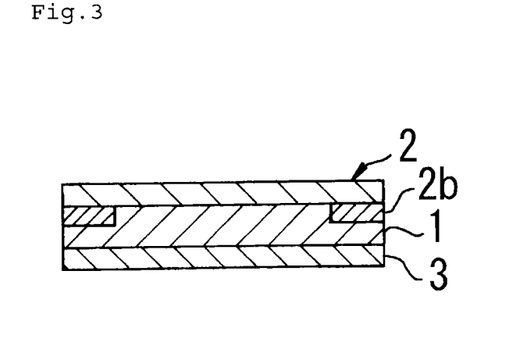
FIG. 3 is a cross-sectional view illustrating an example of the state in which a surface protective panel and a touch panel are bonded to each other using the double-sided adhesive sheet of the embodiment illustrated in FIG. 1.

A double-sided adhesive sheet 1 for image display device of an embodiment of the invention is an adhesive sheet having a rectangular shape in plan view to bond a surface protective panel 2 and a touch panel 3 as illustrated in FIGS. 1 to 3. The surface protective panel 2 has a stepped portion 2b on an adhesion surface 2a to adhere to the double-sided adhesive sheet 1. The surface shape of the bonding surface 1a of the double-sided adhesive sheet 1 to be bonded to the adhesion surface 2a is shaped in accordance with the surface shape of the adhesion surface 2a.

The image display device includes a smartphone, a tablet, a mobile phone, television, a game console, a personal computer, a car navigation system, ATM, and a fish finder which are equipped with a liquid crystal display (LCD), an organic EL display device (OLED), a plasma display panel (PDP) and the like.

In the present embodiment, the double-sided adhesive sheet 1 is used to bond the surface protective panel 2 and the touch panel 3, but the use is not limited to this. The double-sided adhesive sheet 1 can be used to bond any two adherends selected from components for image display device of a surface protective panel, a touch panel, and an image display panel, and it is particularly preferably used to bond a surface protective panel and a touch panel or a touch panel and an image display panel.

Meanwhile, the surface protective panel can be formed from tempered glass or a plastic material such as acrylic resin plate or a polycarbonate plate. In addition, the touch panel can be formed from an on-cell or in-cell type member in which a glass sensor or a plastic film sensor and a touch panel function are integrated with the image display panel.

The adhesion surface 2a of the surface protective panel 2 to adhere to the double-sided adhesive sheet 1 has a stepped portion 2b as illustrated in FIG. 1 or FIG. 2, and this stepped portion 2b can be formed, for example, by subjecting the peripheral portion of the back surface of the surface protective panel 2 to the printing in white, black or the like so that the peripheral portion of the adhesion surface 2a protrudes one step higher. In other words, the adhesion surface 2a of the surface protective panel 2 can be formed into a cross-sectional concave shape equipped with a viewable aperture surface 2c having a concave shape in the vicinity of the center. The height of the stepped portion 2b is not limited, but the stepped portion can be formed to be 1 μm or more and 100 µm or less and preferably 5 µm or more and 90 µm or less from the viewable aperture surface $2c$.

Figure 4:
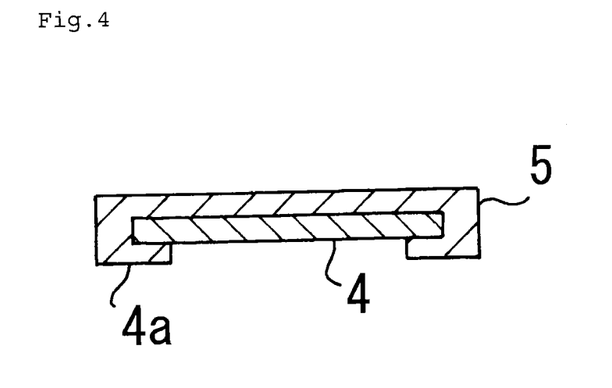
FIG. 4 is a cross-sectional view illustrating an example in which an image display panel is equipped with a bezel member.

The stepped portion $2b$ in the present embodiment is formed by printing, but it is possible to form the stepped portion $4a$ by equipping the peripheral portion of the image display panel 4 with a bezel member 5, for example, as illustrated in FIG. 4.

In addition, the stepped portion $2b$ is formed in a one-step shape in the present embodiment but is not limited to this, and it may be formed in a multistep shape such as a two-step shape and a three-step shape. The surface $2d$ of the stepped portion $2b$ is planar in the present embodiment but is not limited to this, and it can be formed in a shape such as an inclined shape, a curved convex shape, and a curved concave shape.

The shape may be curved but not linear when the electrodes and cables for each member are disposed on the stepped portion $2b$ or the viewable aperture surface $2c$ is subjected to the corner R working for design particularly depending on the image display device.

The inner peripheral surface $2e$ of the stepped portion $2b$ can be substantially vertically formed with respect to the viewable aperture surface $2c$ but not limited to this. For example, it can be formed to be 0° or more and 180° or less and preferably 60° or more and 90° or less with respect to the viewable aperture surface $2c$. The inner peripheral surface $2d$ can also be formed in a stepped shape, a circular arc shape, a curved shape or the like.

In the double-sided adhesive sheet 1, the surface shape of the bonding surface $1a$ to be bonded to the adhesion surface $2a$ of the surface protective panel 2 is shaped in accordance with the surface shape of the adhesion surface $2a$. In other words, the cross-sectional convex shape is formed by forming a convex portion $1b$ obtained by protruding the vicinity of the center of the bonding surface $1a$ one step higher in a substantially rectangular shape. It is possible to fit the bonding surface $1a$ with the adhesion surface $2a$ in close contact without space therebetween as illustrated in FIG. 3 when the double-sided adhesive sheet 1 is bonded to the surface protective panel 2 by forming the surface shape of the bonding surface $1a$ in a shape which perfectly fits to the surface shape of the adhesion surface $2a$ as described above, and thus it is possible to bond the bonding surface $1a$ to the adhesion surface $2a$ without a gap and to prevent the deterioration in visibility, the peeling and foaming, or the like.

It is preferable that the bonding surface $1a$ is shaped into a shape which perfectly fit along the surface shape of the adhesion surface $2a$ and is fitted therewith without space therebetween. The double-sided adhesive sheet 1 is a bit fluid, and thus an error can be permitted to a certain extent, for example, an error of −5% or more and +5% or less and particularly preferably −1% or more and +1% or less.

For example, the height of the convex portion $1b$ of the double-sided adhesive sheet 1 can be formed so as to have an error of −5% or more and +5% or less and particularly preferably −1% or more and +1% or less with respect to the stepped portion $2b$ of the surface protective panel 2. In addition, for example, the width of the convex portion $1b$ of the double-sided adhesive sheet 1 can be formed so as to be 0.95 time or more and 1.05 times or less and preferably 0.99 time or more and 1.01 times or less with respect to the width of the viewable aperture surface $2c$ of the surface protective panel 2.

In addition, the maximum thickness of the double-sided adhesive sheet 1 can be formed so as to be 1.0 time or more and 3.0 times or less and preferably 1.1 times or more and 2.0 times or less with respect to the height of the stepped portion $2b$.

In addition, in the double-sided adhesive sheet 1, only one surface side (surface protective panel 2 side) is subjected to the shaping process, but both sides can also be subjected to the shaping process in a case in which the adhesion surface of the touch panel 3 has a stepped portion.

Figure 5:
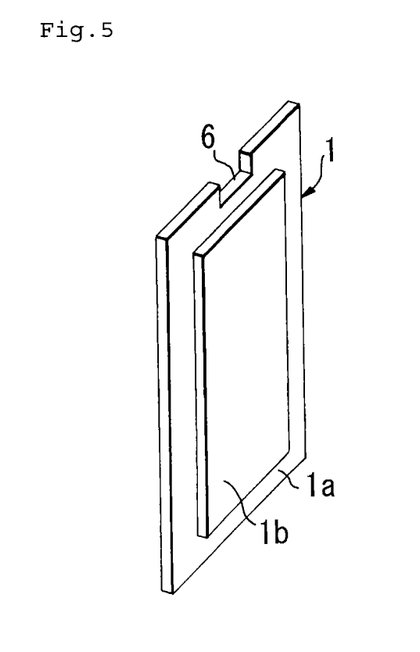
FIG. 5 is a perspective view illustrating an example of a case in which the double-sided adhesive sheet of the embodiment illustrated in FIG. 1 is provided with a cutout portion.
Figure 6:
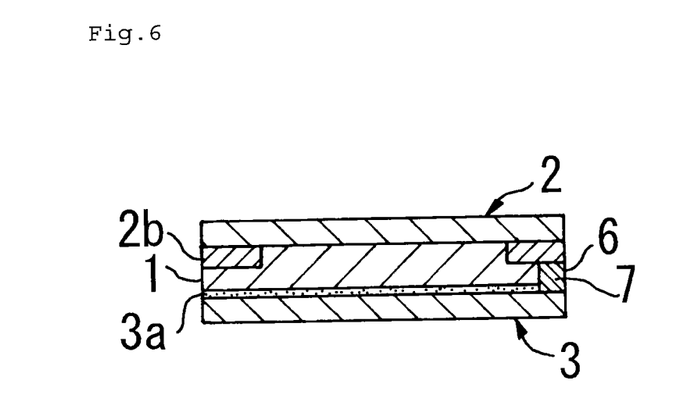
FIG. 6 is a cross-sectional view illustrating an example of a state in which a surface protective panel and a touch panel are bonded to each other using the double-sided adhesive sheet of the embodiment illustrated in FIG. 5 while housing an electrode member in the cutout portion.
Figure 7:
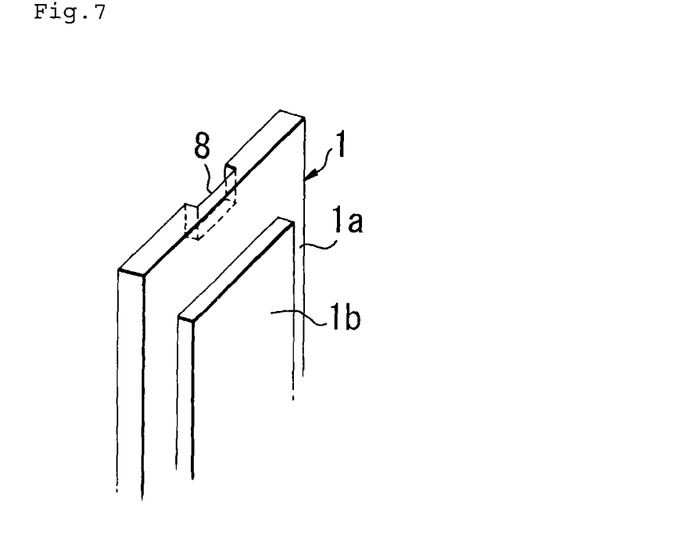
FIG. 7 is a partially enlarged perspective view illustrating an example of a case in which the double-sided adhesive sheet of the embodiment illustrated in FIG. 1 is provided with a concave portion.

The peripheral portion of the double-sided adhesive sheet 1 can also be provided with a cutout portion 6 to house an electrode terminal 7 connected to an electrode pattern $3a$ on the touch panel 3 as illustrated in FIG. 5 or FIG. 6. The cutout portion 6 can be formed, for example, by cutting out the vicinity of the center of one edge portion of the double-sided adhesive sheet 1 into a rectangular shape. In addition, it is also possible to form the double-sided adhesive sheet 1 into a concave or a concave portion 8 as illustrated in FIG. 7. The concave portion 8 can house the electrode terminal 7 in the same manner as the cutout portion 6. The cutout portion 6 and the concave portion 8 can be formed by cutting using the Thomson blade, pressing using a press molding flask, or the like.

It is possible to use a material for adhesive sheet known in the related art as the material of the double-sided adhesive sheet 1. Examples thereof may include 1) those formed by blending a cross-linking monomer and a cross-linking initiator or a reaction catalyst if necessary with a (meth) acrylate ester-based polymer (hereinafter, referred to as the "acrylate ester-based (co)polymer" to indicate including a copolymer) as a base resin and conducting a crosslinking reaction, 2) those formed by blending a cross-linking monomer and a cross-linking initiator or a reaction catalyst if necessary with a butadiene- or isoprene-based copolymer as a base resin and conducting a crosslinking reaction, 3) those formed by blending a cross-linking monomer and a cross-linking initiator or a reaction catalyst if necessary with a silicone-based polymer as a base resin and conducting a crosslinking reaction, and 4) a polyurethane-based adhesive using a polyurethane-based polymer as a base resin.

In the invention, the physical properties of the adhesive sheet itself are not an essential problem, but it is possible to preferably use 1) the acrylate-based (co)polymer from the viewpoint of adhesiveness, transparency, and weather resistance.

It is possible to preferably use 2) the butadiene- or isoprene-based copolymer in a case in which the electrical characteristics and the performance such as a low refractive index are required.

It is possible to preferably use 3) the silicone-based copolymer in a case in which the performance such as the heat resistance and the rubber elasticity in a wide temperature region are required.

It is possible to preferably use 4) the polyurethane-based polymer in a case in which the performance such as the repeelability is required.

In the case of the acrylate ester polymer (including a copolymer), it is possible to appropriately adjust the characteristics such as the glass transition temperature (Tg) by the kind and composition ratio of the acrylic monomer or methacrylic monomer used to polymerize this, and further the polymerization conditions.

The examples of the acrylic monomer or methacrylic monomer used to polymerize the acrylate ester polymer may include 2-ethylhexyl acrylate, n-octyl acrylate, n-butyl acrylate, ethyl acrylate, and methyl methacrylate. It is also possible to use vinyl acetate, hydroxyethyl acrylate, acrylic acid, glycidyl acrylate, acrylamide, acrylonitrile, methacrylonitrile, fluorine acrylate, and silicone acrylate which are obtained by copolymerizing these with a hydrophilic group, an organic functional group, or the like.

A (meth)acrylic acid alkyl ester-based copolymer is particularly preferable among the acrylate ester polymers.

The (meth)acrylate, that is, the alkyl acrylate or alkyl methacrylate component used to form the (meth)acrylic acid alkyl ester-based copolymer is preferably one kind of alkyl acrylate or alkyl methacrylate in which the alkyl group is any one of n-octyl, iso-octyl, 2-ethylhexyl, n-butyl, isobutyl, methyl, ethyl, and isopropyl, or a mixture of two or more kinds selected from these.

As another component, an acrylate or methacrylate having an organic functional group such as a carboxyl group, a hydroxyl group, or a glycidyl group may be copolymerized. Specifically, it is possible to obtain a (meth)acrylate ester-based copolymer polymer by the thermal polymerization of the monomer component in which the alkyl(meth)acrylate component and a (meth)acrylate component having an organic functional group are appropriately selectively combined as the starting material.

Among them, it is possible to preferably mention one kind of alkyl acrylate such as iso-octyl acrylate, n-octyl acrylate, n-butyl acrylate, and 2-ethylhexyl acrylate or a mixture of two or more kinds selected from these, or those obtained by copolymerizing at least one or more kinds selected from iso-octyl acrylate, n-octyl acrylate, n-butyl acrylate, and 2-ethylhexyl acrylate with acrylic acid.

It is possible to employ a known polymerization method such as a solution polymerization, an emulsion polymerization, a bulk polymerization, and a suspension polymerization as the polymerization treatment using these monomers, and it is possible to obtain the acrylate ester copolymer by using a polymerization initiator such as a thermal polymerization initiator or a photopolymerization initiator according to the polymerization method at that time.

As the crosslinking monomer (also referred to as the "crosslinking agent") used when crosslinking the acrylate ester polymer, it is possible to use a polyfunctional (meth)acrylate having two or more (meth)acryloyl groups, a polyfunctional organic group resin having two or more organic functional groups such as an isocyanate group, an epoxy group, a melamine group, a glycol group, a siloxane group, and an amino group, and an organometallic compound having a metal complex of zinc, aluminum, sodium, zirconium, calcium or the like.

Examples of the polyfunctional (meth)acrylate may include 1,4-butanediol diacrylate, 1,6-hexanediol diacrylate, 1,9-nonanediol diacrylate, and trimethylolpropane triacrylate.

The content of the crosslinking monomer may be adjusted together with other factors so as to obtain the desired holding power and is generally adjusted within the range to be a proportion of from 0.01 to 40.0 parts by mass, preferably from 0.1 to 30.0 parts by mass, and among them, from 0.5 to 30.0 parts by mass with respect to 100 parts by mass of the base polymer. However, the content may exceed this range in balance with other matters.

In addition, it is effective to appropriately add a crosslinking initiator (peroxide initiator, photoinitiator) and a reaction catalyst (tertiary amine-based compound, quaternary ammonium-based compound, tin compound of lauric acid and the like) when crosslinking the acrylate ester polymer.

It is preferable to blend a photoinitiator in the case of crosslinking by ultraviolet irradiation.

As the photoinitiator, either of a cleavage type photoinitiator or a hydrogen abstraction type photoinitiator may be used or both of them may be used concurrently.

Examples of the cleavage type photoinitiator may include benzoin butyl ether, benzyl dimethyl ketal, and hydroxyacetophenone.

On the other hand, examples of the hydrogen abstraction type photoinitiator may include benzophenone, Michler's ketone, dibenzosuberone, 2-ethyl anthraquinone, and isobutyl thioxanthone.

However, the photoinitiator is not limited to the substances mentioned above.

The amount of the photoinitiator added may be adjusted such that the storage shear modulus is within a predetermined range and is generally adjusted within the range to be a proportion of from 0.05 to 5.0 parts by mass with respect to 100 parts by mass of the base polymer. It is preferable to use the hydrogen abstraction type photoinitiator and the cleavage type photoinitiator concurrently at a proportion of 1:1. However, the amount of the photoinitiator added may exceed this range in balance with other matters.

It is possible to appropriately blend various kinds of additives such as a coloring such as a pigment or dye having near-infrared absorption property, a tackifier, an antioxidant, an anti-aging agent, a moisture absorbent, an ultraviolet absorber, a silane coupling agent, a natural or synthetic resin, and a glass fiber or glass beads if necessary in addition to the above components.

The double-sided adhesive sheet 1 can be formed in a single layer using a single material or in a multilayer such as two layers or three layers.

It is possible to layer a release film on one surface or both surfaces of the double-sided adhesive sheet 1 in order to facilitate handling or the like. As the release film, it is possible to use those formed of an existing material of the related art, and for example, a PET film and the like can be used.

It is preferable to layer the release film on the double-sided adhesive sheet 1 as follows, for example.

Figure 8:
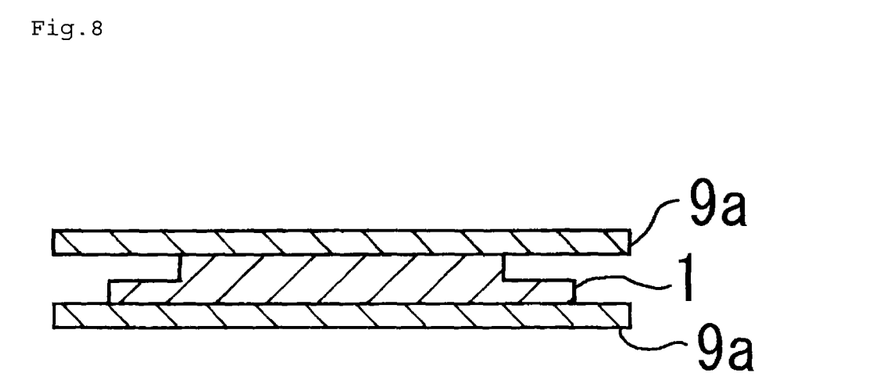
FIG. 8 is a cross-sectional view illustrating an example of a case in which release films are layered on both surface sides of the double-sided adhesive sheet of the embodiment illustrated in FIG. 1.

It is possible to layer the release films on both surface sides of the double-sided adhesive sheet 1 such that the peripheral portion of a release film 9a projects outward than the peripheral portion of the double-sided adhesive sheet 1 as illustrated in FIG. 8. This makes it hard to directly touch the double-sided adhesive sheet 1 so that the bonding work is facilitated. The release film may be layered such that the peripheral portion of the release film 9a on at least one surface side projects outward than the peripheral portion of the double-sided adhesive sheet 1.

Figure 9:
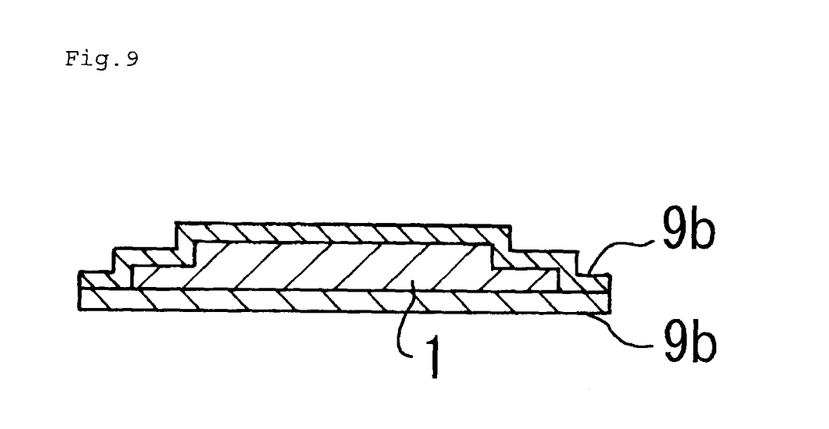
FIG. 9 is a cross-sectional view illustrating an example of a case in which release films are layered on both surface sides of the double-sided adhesive sheet of the embodiment illustrated in FIG. 1.

In addition, it is also possible to layer release films 9b on both surface sides of the double-sided adhesive sheet 1, to shape the release film 9b on one surface side in accordance with the surface shape of the bonding surface 1a, and to layer the release film 9b to fit with the bonding surface 1a in close contact as illustrated in FIG. 9. This makes it easy for the double-sided adhesive sheet 1 to retain the shape. The release films on both surface sides may be shaping processed in a case in which both surface sides of the double-sided adhesive sheet are shaping processed.

Figure 10:
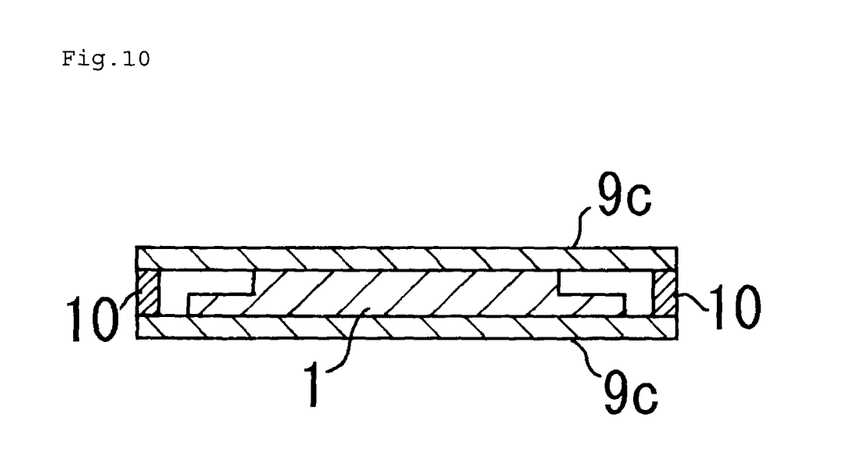
FIG. 10 is a cross-sectional view illustrating an example of a case in which release films are layered on both surface sides of the double-sided adhesive sheet of the embodiment illustrated in FIG. 1.

In addition, it is also possible to layer release films 9c on both surface sides of the double-sided adhesive sheet 1, to layer the release films 9c such that the peripheral portion thereof projects outward than the peripheral portion of the double-sided adhesive sheet 1, and a guide portion 10 to prevent the stress from being applied to the double-sided adhesive sheet 1 is provided to a part or the entire periphery of the peripheral portion of the release film 9c, the guide portion being interposing between the two release films as illustrated in FIG. 10. This makes it possible to prevent the deformation of the double-sided adhesive sheet 1.

It is possible to form the guide portion 10 by providing various kinds of film pieces at a predetermined position. For example, a double-sided adhesive sheet with release film which has a configuration that the double-sided adhesive sheet 1 is sandwiched by the release films and which is cut into a predetermined size is fabricated and is then put into a state in which one adhesive surface of the double-sided adhesive sheet 1 is exposed by peeling off either of the release films, and the film pieces are provided at the predetermined position (for example, the facing edge portion) of the release film which projects outward than the peripheral portion of the double-sided adhesive sheet 1.

Next, the release film is bonded to the exposed adhesive surface of the double-sided adhesive sheet 1, whereby it is possible to form a double-sided adhesive sheet having the guide portion 10.

At this time, the material of the film pieces is not particularly limited, and examples thereof may include various kinds of polyolefin-based resins such as polypropylene and polyethylene, various kinds of polyester-based resins such as polylactic acid and polyethylene terephthalate, and various kinds of polyamide-based resins such as 6-nylon and 12-nylon. Among them, a film formed of polyethylene terephthalate is preferable in terms of availability, heat resistance, strength and the like. In addition, it is preferable that one surface or both surfaces of the guide portion 10 is coated with an adhesive or a material which tends to be in close contact with the release film so as not to move from an arbitrary position on the release film.

In addition, the guide portion 10 is not necessarily composed of one sheet of film and may be a layered film composed of a plurality of films. At that time, the films to be layered do not necessarily have the same shape, and it is also possible to superimpose the film pieces having different shapes and to impart a specific function to each of them.

In addition, the guide portion 10 is preferably provided at least at the edge portions which face each other. The height of the guide portion 10 is not particularly limited, but it is preferably 0.5 time or more and 2.0 times or less and particularly 1.0 time or more and 1.5 times or less the maximum thickness of the double-sided adhesive sheet 1.

The double-sided adhesive sheet 1 can be fabricated, for example, by subjecting an adhesive sheet to the shaping process such as the shaping by a press molding flask, the shaping using a mold, the shaping by a roll, and the shaping by layering.

It is possible to fabricate the double-sided adhesive sheet 1 that is shaping processed by performing the shaping by a press molding flask in which pressing is performed with respect to a planar adhesive sheet having a release film with the release film being present or is directly performed with respect to an adhesive sheet.

In addition, it is possible to fabricate the double-sided adhesive sheet 1 that is shaping processed by shaping processing a release film by pressing using a press molding flask and then coating or pouring an adhesive composition on this release film.

It is possible to fabricate the double-sided adhesive sheet 1 that is shaping processed by performing the shaping using a mold in which an adhesive composition is poured into a molding flask and solidified.

It is possible to fabricate the double-sided adhesive sheet 1 that is shaping processed by performing the shaping by a roll in which a planar adhesive sheet having a release film passes through between rolls.

It is possible to fabricate the double-sided adhesive sheet 1 that is shaping processed by performing the shaping by layering in which two adhesive sheets having different sizes are fabricated and then superimposed on each other.

In the double-sided adhesive sheet 1, the surface shape of the bonding surface 1a is shaped in accordance with the surface shape of the adhesion surface 2a, and thus it is possible to bond the each component for image display device such as the surface protective panel 2 or the touch panel 3 without space therebetween although the adhesion surface 2a has a stepped portion 2b due to printing or the like.

Hereinafter, the method of fabricating the double-sided adhesive sheet 1, particularly an example of the method of shaping the surface shape of the bonding surface of the double-sided adhesive sheet will be more specifically described.

(Method of Shaping by Press Flask)

a) Method of Pressing with Release Film being Present

The original sheet of a flat adhesive sheet having release films layered on both surfaces thereof is appropriately slit, and the flat adhesive sheet is hot pressed with the mold release mold being present using the press molding flask formed in accordance with the surface irregularity shape of the adherend, that is, the surface shape of the adhesion surface 2a while sending and feeding the slit adhesive sheet so as to perform the surface shaping.

In the next process, the release film on one surface side is peeled off, the exposed adhesive sheet is cut along the contour of the shaped shape, the unnecessary adhesive border portion on the outer periphery of the contour is removed, and then a new release film which is wider than the contour cutting dimension is repasted to the adhesive sheet.

The adhesive sheet is cut into an individual piece having a handleable shape in another process, thereby fabricating the double-sided adhesive sheet 1.

b) Method of Directly Pressing Adhesive Sheet

The original sheet of a flat adhesive sheet having release films layered on both surfaces thereof is appropriately slit, and the release film on one surface side is peeled off and the flat adhesive sheet is directly hot pressed using the press molding flask formed in accordance with the surface irregularity shape of the adherend, that is, the surface shape of the adhesion surface 2a while sending and feeding the slit adhesive sheet so as to perform the surface shaping.

In the next process, the adhesive sheet having one surface side exposed is cut along the contour of the shaped shape, the unnecessary adhesive border portion on the outer periphery of the contour is removed, and then a new release film which is wider than the contour cutting dimension is repasted to the adhesive sheet.

The adhesive sheet is cut into an individual piece having a handleable shape in another process, thereby fabricating the double-sided adhesive sheet 1.

The material of the press molding flask is not particularly limited, and it is also possible to use a silicone resin excellent in mold releasing property or a fluorine-based resin. In addition, it is also possible to suitably use even the material which does not exhibit mold releasing property such as stainless steel and aluminum by coating various kinds of mold releasing agents thereon.

The temperature of hot pressing is, for example, equal to or higher than room temperature, preferably 80° C. or higher, and more preferably 100° C. or higher. In addition, the pressing pressure, the pressing depth, and the pressing time may be appropriately adjusted by the dimension, the shape, and the shaping state.

In addition, examples of the cutting method may include a cutting method by the Thomson blade or a rotary blade.

Moreover, there is a method in which the surface shaping and the contour cutting are performed in separate processes as described above, but it is also possible to perform the surface shaping and the contour cutting in one process, for example, when using a mold formed by integrating the mold for shaping and the cutting mold.

(Method by Shaping Processed Release Film)

The original sheet of the adhesive sheet that is surface shaped is fabricated by disposing a release film which is shaped in accordance with the surface irregularity shape of the adherend, that is, the surface shape of the adhesion surface 2a in advance on at least one surface side of the adhesive sheet and coating an adhesive.

Next, the original sheet is appropriately slit by fitting the width of the surface irregularity shape thereof, the release film on one surface side is peeled off from the slit adhesive sheet in the next process, the exposed surface of the adhesive sheet is cut along the contour, the unnecessary adhesive border portion on the outer periphery of the contour is removed, and then a new release film which is wider than the contour cutting dimension is repasted to the adhesive sheet.

The adhesive sheet is cut into an individual piece having a handleable shape in another process, thereby fabricating the double-sided adhesive sheet 1.

(Method of Shaping Using Mold)

The adhesive sheet that is surface shaped is formed by coating or pouring an adhesive on a mold that copies the surface irregularity shape of the adherend, that is, the surface shape of the adhesion surface 2a.

In a case in which the mold is on only one surface, the release film is pasted to the other side after coating or pouring the adhesive and they are brought into close contact by rolling a rubber covered roll or the like thereon.

The adhesive is solidified, and the double-sided adhesive sheet 1 is then separated from the mold by pulling the release film.

The adhesive overflowed when coating or pouring into the mold is removed, the guide portion 10 is provided if necessary, and a release film is bonded to the exposed adhesive sheet.

The adhesive sheet is cut into an individual piece having a handleable shape in another process, thereby fabricating the double-sided adhesive sheet 1.

In a case in which the molds are on both surfaces, one mold is removed after solidifying the adhesive, a release film is pasted instead, and they are brought into close contact by rolling a rubber covered roll or the like thereon.

Thereafter, the adhesive sheet is separated from the mold by pulling the release film.

The adhesive overflowed when coating or pouring into the mold is removed, the guide portion 10 is provided if necessary, and a release film is bonded to the exposed adhesive sheet.

The adhesive sheet is cut into an individual piece having a handleable shape in another process, thereby fabricating the double-sided adhesive sheet 1.

The material of the mold is not particularly limited, and it is also possible to use a silicone resin excellent in mold releasing property or a fluorine-based resin. In addition, it is also possible to suitably use the mold made of the material which does not exhibit mold releasing property such as stainless steel and aluminum by coating various kinds of mold releasing agents thereon.

(Method of Shaping by Roll)

An adhesive is coated between two pieces of flat release films, and then a shaping roll that copies the surface irregularity shape of the adherend, that is, the surface shape of the adhesion surface 2a is disposed on at least one surface side thereof, and the adhesive sheet is allowed to pass through between the roll on one surface side and the roll on the other surface side by being sandwiched therebetween so as to perform the surface shaping, thereby fabricating the original sheet of the adhesive sheet.

Next, the original sheet is appropriately slit by fitting the width of the surface irregularity shape thereof, the release film on one surface side is peeled off from the slit adhesive sheet in the next process, the exposed adhesive sheet is cut along the contour of the shaped shape, the unnecessary adhesive border portion on the outer periphery of the contour is removed, and then a new release film which is wider than the contour cutting dimension is repasted to the adhesive sheet.

The adhesive sheet is cut into an individual piece having a handleable shape in another process, thereby fabricating the double-sided adhesive sheet 1.

The temperature at which the surface shaping is performed by disposing the shaping roll and the adhesive sheet is allowed to pass through between the roll on one surface side and the roll on the other surface side by being sandwiched therebetween is equal to or higher than room temperature, preferably 80° C. or higher, and more preferably 100° C. or higher.

(Shaping by Layering)

The original sheet of the flat adhesive sheet having release films layered on both surfaces thereof is appropriately slit, and the first flat adhesive sheet which is cut into the shape of the viewable aperture surface 2c and the second flat adhesive sheet which is cut into the shape of the surface 2d of the stepped portion 2b and has a shape having different sizes are respectively fabricated in advance.

Thereafter, the release film on one surface side of each of them is peeled off, and the exposed adhesive surfaces are superimposed by pasting, thereby fabricating the double-sided adhesive sheet 1 subjected to a desired surface shaping.

EXPLANATIONS OF LETTERS OR NUMERALS

1 double-sided adhesive sheet for image device
1a bonding surface
1b convex portion
2 surface protective panel
2a adhesion surface
2b stepped portion
2c viewable aperture surface
2d surface
2e inner peripheral surface
3 touch panel
3a electrode pattern
4 image display panel
4a stepped portion
5 bezel member
6 cutout portion
7 electrode terminal
8 concave portion
9a to 9c release film
10 guide portion

The invention claimed is:

1. A double-sided adhesive sheet with a release film for an image display device, comprising a double-sided adhesive sheet to bond any two adherends selected from the group consisting of a surface protective panel, a touch panel, and an image display panel, wherein
   release films layered on both surface sides of the double-sided adhesive sheet;
   at least one of the adherends has a stepped portion on an adhesion surface to adhere to the double-sided adhesive sheet;
   a surface shape of a bonding surface of the double-sided adhesive sheet to adhere to the adhesion surface is shaped in accordance with a surface shape of the adhesion surface; and,
   at least one surface side of the release film is shaped in accordance with the surface shape of the bonding surface.

2. The double-sided adhesive sheet with a release film for an image display device according to claim 1, wherein
   the release film is layered such that a peripheral portion thereof projects outward than a peripheral portion of the double-sided adhesive sheet;
   a guide portion which is to prevent stress from being applied to the double-sided adhesive sheet is provided to a part or the entire periphery of the peripheral portion of the release film; and,
   the guide portion is interposed between the two release films.

3. An image display device comprising the double-sided adhesive sheet according to claim 1.

4. The double-sided adhesive sheet with a release film for an image display device according to claim 1, wherein release film is layered such that a peripheral portion of at least one surface side of the release film projects outward than a peripheral portion of the double-sided adhesive sheet.

5. The double-sided adhesive sheet with a release film for an image display device according to claim 1, wherein the adhesion surface of the double-sided adhesive sheet has a stepped portion of a protruded peripheral portion.

6. The double-sided adhesive sheet with a release film for an image display device according to claim 1, wherein a peripheral portion of the double-sided adhesive sheet is provided with a cutout portion or a concave portion housing an electrode terminal.

7. The double-sided adhesive sheet with a release film for an image display device according to claim 1, wherein the adhesion surface of the double-sided adhesive sheet has a stepped portion formed by a bezel member holding an image display panel.

8. The double-sided adhesive sheet with a release film for an image display device according to claim 1, wherein a maximum thickness of the double-sided adhesive sheet is from 1.0 to 3.0 times a height of the stepped portion.

9. The double-sided adhesive sheet with a release film for an image display device according to claim 1, wherein the double-sided adhesive sheet is shaped by pressing the adhesive sheet having a release film layered thereon with a press molding flask with the release film being present.

10. The double-sided adhesive sheet with a release film for an image display device according to claim 1, wherein the double-sided adhesive sheet is shaped by pressing the double-sided adhesive sheet using a press molding flask.

11. The double-sided adhesive sheet with a release film for an image display device according to claim 1, wherein the double-sided adhesive sheet is shaped by coating an adhesive on a release film that is shaped by pressing with a press molding flask.

12. The double-sided adhesive sheet with a release film for an image display device according to claim 1, wherein the double-sided adhesive sheet is shaped by pouring an adhesive into a mold and solidifying it.

13. The double-sided adhesive sheet with a release film for an image display device according to claim 1, wherein the double-sided adhesive sheet is shaped by passing the adhesive sheet having release films layered on both surfaces between rolls.

14. The double-sided adhesive sheet with a release film for an image display device according to claim 1, wherein the double-sided adhesive sheet is shaped by superimposing two adhesive sheets.

* * * * *